Dec. 23, 1969  H. W. MAURER  3,485,667
CONTINUOUS STARCH CONVERSION
Filed Jan. 29, 1968  2 Sheets-Sheet 2

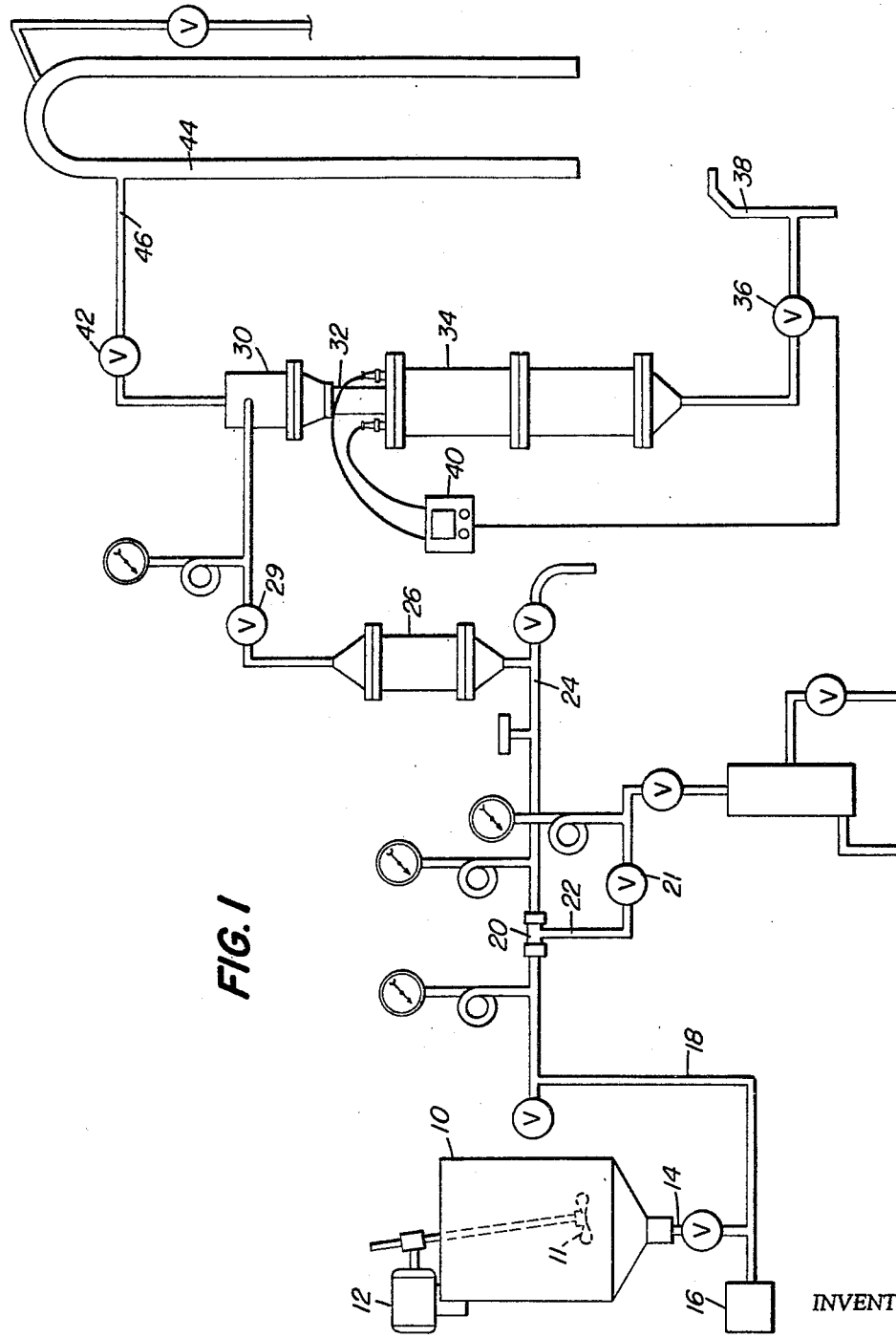

INVENTOR
Hans W. Maurer

BY Larry C. Hall
ATTORNEY

United States Patent Office 3,485,667
Patented Dec. 23, 1969

3,485,667
CONTINUOUS STARCH CONVERSION
Hans W. Maurer, Beltsville, Md., assignor to Westvaco Corporation, New York, N.Y., a corporation of Delaware
Filed Jan. 29, 1968, Ser. No. 701,334
Int. Cl. C13k 1/06; C13l 1/00; C13g 1/00
U.S. Cl. 127—28                                      10 Claims

ABSTRACT OF THE DISCLOSURE

An apparatus for the continuous conversion of starch wherein means is provided for separating the gaseous and vapor phase from the liquid product after the reaction chamber and before the retention vessel, for controlling the supply rate, retention time, and degree of reaction of the starch paste.

BRIEF SUMMARY OF THE INVENTION

The present invention pertains to an improved apparatus and method for the continuous pasting or cooking of starch. In particular, this invention is intended for the continuous conversion of starch by pressure cooking and chemical reaction.

The term "starch" as used hereinafter is intended to cover all of the most common and commercially available types of starches including potato, rice, tapioca, wheat, and corn starch. One of the most important usages of starch is as an adhesive or binder material, and raw or uncooked starch has little or no adhesive or binding properties. However, aqueous slurries of starch may be cooked or pasted with or without the presence of various modifying agents such as alkalies, acids or enzymes, so as to develop or bring out the inherent adhesive properties of the starch.

Starch and starch base adhesives are used in large volumes for a wide variety of commercial purposes. For example, large quantities of starch are required in the paper industry where the starch is used both as a size or filler for the paper stock itself, and also in various coatings and finishes for the paper.

Starch in its raw state is a granular material insoluble in cold water. At elevated temperatures, these granules swell, dissolve or disperse in water and under proper manipulation will form a smooth paste or solution which gels upon cooling. This gelling can be reduced or eliminated when starch has been exposed to the degrading and/or substituting action of certain chemical agents as known in the art. Normally, however, the cooking of starch involves operational difficulties and even with the most careful blending, agitation and temperature control, the gelatinization is not complete and a dispersion will contain agglomerates of raw starch. It has heretofore been proposed to employ a steam injector for attracting a slurry of starch from a supply tank and to simultaneously cook the slurry. It has also been proposed to utilize a steam ejector for merging a starch slurry and steam to effect the substantially instantaneous cooking of starch granules in aqueous suspension. In all methods of continuous starch conversion however, gases are released which had previously been dissolved in a liquid phase of the starch slurry.

In some equipment, pressure in the retention equipment is maintained at a level slightly higher than at the jet. This will condense all steam introduced into the equipment, and requires the use of special eductor type steam jets. Further, the entire equipment must be filled with hot and pressurized water before the starch paste is introduced.

When the conversion is performed at temperatures above 100 degrees C., in the presence of an excess of steam, an additional amount of gaseous and/or vapor phase is incorporated in the starch paste. In addition, when a chemical reaction is performed during and immediately following the starch cooking process, oxidation occurs which releases oxygen, carbon dioxide, and volatile starch decomposition products. Any amount of incorporated gaseous or vapor phase influences the delivery rate of the starch paste in the converter and, therefore, reduces the retention time in the subsequent holding tanks including pipes, coils, etc. In order to achieve a controlled flow rate and retention of cooked starch in the starch modification equipment, the excess steam from the pasting process, or, any gas which had previously been dissolved in the water or which is produced during starch conversion, has to be removed.

In order to satisfy these requirements, the present invention was developed. A phase separator was designed similar to a hydrocyclone type device with a larger than normal discharge orifice for incorporation in an otherwise conventional starch conversion apparatus. Subsequent trials performed with the phase separator in the system, and, removed from the system, illustrated that the device did indeed adjust retention time, provide a controlled supply rate, and, provide a uniform degree of reaction to the final product.

The apparatus so modified also proved useful under different operating conditions and with different applications. Some of the advantages of the modified equipment would be: (1) it can be used with a wide variety of steam jets, preferably those that can be operated with an excess of steam; (2) it does not require special start up procedures to receive full condensation of steam, and (3) it eliminates the undesired effect of dispersed gases in the flow rate of the material through the equipment and, thus, controls the time of reaction.

DESCRIPTION OF THE DRAWING

FIGURE 1 is a schematic illustration of the starch conversion apparatus;

DETAILED DESCRIPTION

Figure 3:
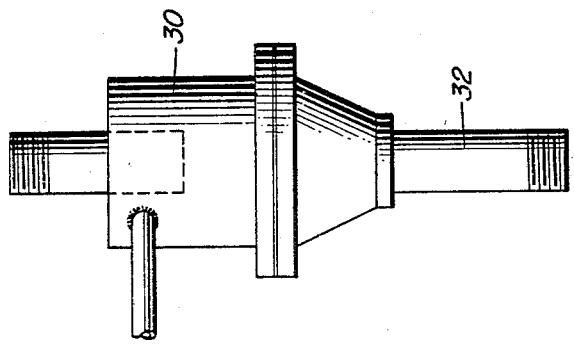

FIGURE 1 of the drawing shows schematically a flow diagram of the overall process and apparatus. The slurry is formed in a tank 10 which is provided with a motor 12 driving an agitator 11. Line 14 is provided between the tank 10 to a positive displacement pump 16 which feeds the slurry through line 18 to the starch cooker 20. Also connected to the starch cooker 20 is a pressurized steam line 22 including valve 21 which conducts steam to the cooker 20 where the starch slurry is gelatinized by the injection of said steam. The starch cooker 20 is shown diagrammatically and may be one of many known in the art.

The granules of starch in the slurry are instantly heated in the cooker 20 and are then discharged as a gelatinous mass under pressure through line 24 to the reaction chamber 26. The gelatinized starch paste remains at an elevated temperature and pressure as it moves to the reaction chamber 26, where the reaction conditions are determined by the amount of excess steam and position of the pressure valve 29.

Until this point in the process, the conversion apparatus is substantially the same as most prior art equipment. It is customary at this point to flash the paste to atmospheric pressure and to separate the excess steam and vapor from the paste. However, that method does not give the desired continuous supply rate and controlled retention time and, thus, controlled time of reaction desirable for chemically modified starches.

As noted hereinbefore, in order to achieve this necessary operational property there is included in the apparatus a phase separator 30, shown in FIGURE 3, to which the starch paste is conducted after going through the reaction chamber 26. The separator used in the apparatus is an ordinary hydrocyclone type phase separator which was modified slightly for the intended purpose. Here part of the pressure is relieved and the gas and vapor phases are removed from the liquid product. The phase separator 30 is accordingly intended to serve for the removal of gas and excess steam during partial expansion of the product from one level of over atmospheric pressure to another. The thus treated liquid product will be retained in the subsequent retention equipment 34 for a controlled period of time at high pressure and temperature until a chemical reaction is completed. The retention period and unit is essential for the chemical conversion of starch, and, in order to achieve a controlled flow rate and retention of the cooked starch in the conversion equipment, the excess steam from the pasting process and the gas dissolved in the water or which was produced during starch conversion, must be removed.

On the other hand, a statistical evaluation of trials without chemical modification indicated a correlation of viscosity reduction with capacity of slurry flow and excess steam. The effect of retention time on viscosity reduction in these trials only became significant after more than three minutes retention time. Therefore, starch cooking without chemical reaction could be satisfactorily performed without the use of retention equipment. However, retention equipment could be used as a safety measure to guarantee homogeneity of the starch gelatinization.

The starch paste, after leaving the phase separator 30, is conducted by way of line 32 to the retention vessel 34 where it is stored for use. Subsequently, the product is discharged continuously or discontinuously through the valve 36 and pipe 38 in accordance with the level of starch indicated by the control console 40. The pressures existing in the phase separator 30 and retention vessel 34 are controlled by a third back pressure valve 42. In order to remove the gaseous and vapor phase from the apparatus, a steam breaker cold water tower 44 is connected via line 46 to the equipment.

Several attempts were made to design a satisfactory retention control indication and delivery device. In the first attempt, the wall of the retention vessel 34 was used as part of the circuit with two electrodes indicating a "high level" and a "low level." The release valve 36 was operated manually according to the indications read at the control console 40. This form proved unreliable due to a tendency on the part of the paste to become "bridged" between the liquid surface and the high level indicator giving a false indication of high level. Better insulation did not solve this problem, so, a different form using two electrodes at the same level was adopted to give a series electrical circuit. The distance between the electrodes could then be kept greater than the distance between electrodes and the walls of the retention unit 34 to eliminate the bridging effect.

After the conversion equipment was completely assembled and wired, experiments were performed to show the effects achieved from the installation of the phase separator. In order to show the dramatic increase in effective volume and percent capacity available with the equipment as modified, two trials were run, the first showing only water retention and the second illustrating starch paste retention and viscosity.

The apparatus had the following dimensions:

(26) reaction chamber _____gal. volume__ .5
(34) retention vessel _____do____ 2.0
(40) position of electrodes __gal. effective volume__ 1.0

Figure 2:
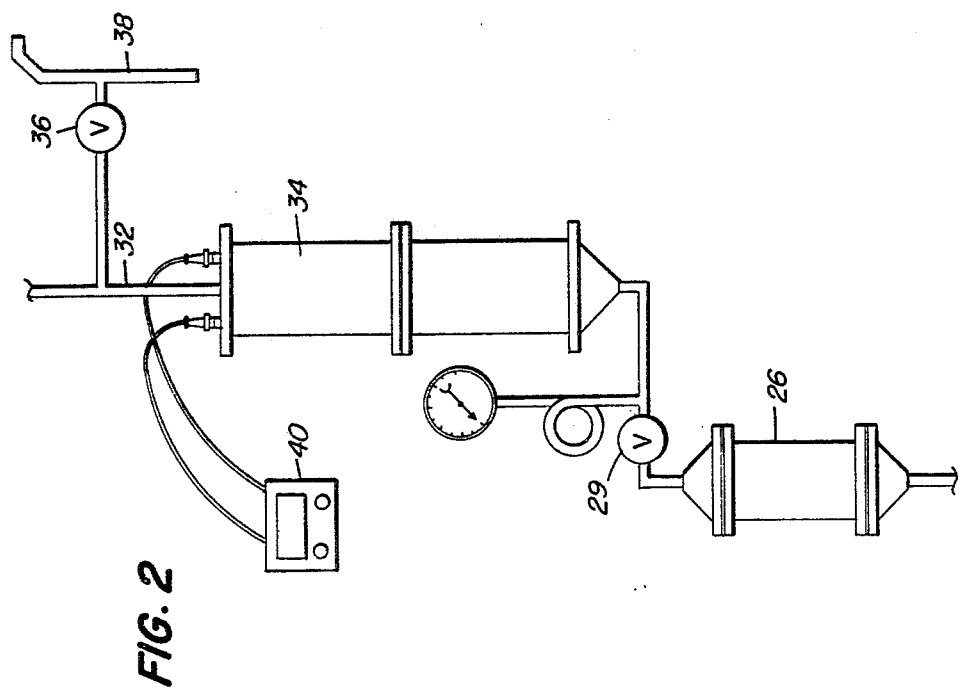
FIGURE 2 is a partial schematic view of the apparatus with the phase separator 30 removed; and, FIGURE 3 shows an enlarged scaled view of the phase separator 30 illustrating the position of the slurry inlet.

For the first trial, the equipment was operated as shown in FIGURE 2 without the phase separator 30, and measurements taken, then, the experiment was run a second time with the phase separator 30 connected into the system as shown in FIGURE 1. With the phase separator 30 removed, the retention vessel 34 was raised and connected with its lower end to the pipe following valve 29 as shown in FIGURE 2. The heated water had to flow upward through the retention vessel 34 and then through line 32 to valve 36 and flash chamber 38. Water was fed to the starch cooker 20 and the subsequent pressurized holding unit at a rate of .33 gal./min. until the level controller 40 indicated the retention vessel 34 to be full, or, until water started flowing through line 32. At this point the cooking process was interrupted and the amount of water contained in the reaction chamber 26 and retention vessel 34 was drained and measured. After the data was taken, the experiment was run again, but with the phase separator 30 in the system. The data for the two runs is summarized in Table 1.

The data shows that increasing the excess of steam reduced the effective volume of the holding chamber in both experiments. However, the experiment performed with the phase separator 30 (Table 1b) was successful in increasing the retention time of water in the starch conversion apparatus in the presence of excess steam and air to 95% of the theoretical value. The margin of 5% was due, apparently, to additional condensate as a result of heat loss by convection and radiation from uninsulated equipment. A further reduction of effective volume would occur when an additional amount of steam was released from the heated water by pressure reduction between the reaction chamber and the retention chamber.

TABLE 1.—WATER RETENTION IN STARCH CONVERTER DURING COOKING WITH EXCESS STEAM

| Cooking Pressure (p.s.i.g.) | | Excess steam | Percent capacity, both holding units |
|---|---|---|---|
| Reaction chamber | Retention vessel | | |
| (a) Without phase separator: | | | |
| 60 | 60 | 1.5 | 68 |
| 40 | 40 | 2.0 | 55 |
| 40 | 40 | 1.8 | 59 |
| 40 | 40 | 1.6 | 62 |
| (b) With phase separator: | | | Reaction chamber / Retention vessel |
| 60 | 40 | 1.7 | 41 / 95 |
| 40 | 20 | 2.0 | 35 / 95 |
| 40 | 20 | 1.7 | 41 / 95 |

For the second trial, the pilot starch converter was used for continuously pressure converting a 35% starch slurry in the presence of chemicals. The following formulation was selected for application:

| | Parts |
|---|---|
| Water | 6150 |
| Starch | 3850 |
| $H_2O_2$ | 7.0 |
| $Al(NO_3)_3$ | 3.85 |

The discharged starch paste was neutralized with sodium citrate and ammonium, and evaluated for Brabender viscosity. This trial was performed like trial 1, with and without the phase separator 30, and, the results of the two experiments are shown in tabulated form in Table 2.

TABLE 2.—STARCH PASTE RETENTION AND VISCOSITY FOR PRESSURE COOKING WITH EXCESS STEAM

| Cooking pressure (p.s.i.g.) | | Excess steam | Brabender viscosity (150° F.) | Percent capacity | |
|---|---|---|---|---|---|
| Reaction chamber | Retention chamber | | | | |
| (a) Without phase separator: | | | | | |
| 60 | 60 | 1.7 | 50 BU(yellow) | 50 | |
| 40 | 40 | 1.8 | 980 | 50 | |
| | | | | Reaction chamber | Retention vessel |
| (b) With phase separator: | | | | | |
| 60 | 40 | 1.7 | 65 BU | 56 | 93.5 |
| 40 | 40 | 1.8 | 620 | 50 | 93.5 |

The daa shows that with the phase separator 30 a nearly full utilization of retention volume was obtained. The procedure of using high pressures and temperatures during starch converson allowed initiation of the starch degrading reaction at a high temperaure of about 310° F. and 60 p.s.i.g., but completion of the reaction at a lower temperature of about 290° F. and 40 p.s.i.g. for reduced coloration of the product and improved viscosity control. As noted in the data, however, the pressure and temperature in the reaction chamber and retention chamber could be maintained constant with only a small change in the percent capacity of the reaction chamber.

As would be expected, where starch slurries were cooked without a phase separator, the retention time would vary depending on the product viscosity and on the ease of separation of the phases under the conditions of equipment dimensions and pressure drop between the starch cooker and the retention unit. With the phase separator 30, the actual retention time could be improved to almost 100%, provided the viscosity was strongly reduced during conversion.

During the experiments, the following procedures were used to obtain data. The starch cooker 20 was filled with steam from the steam valve via line 22 and the pressure conditions adjusted before the starch slurry was fed from tank 10 via lines 14 and 18 to the cooker 20. The experiments were conducted with 80 p.s.i.g. steam pressure, 60 and 40 p.s.i.g. cooking pressure and 40 and 20 p.s.i.g. retention pressure. The respective pressures were adjusted by valves 28 and 42. As the starch paste flowed from cooker 20 through line 24 into the reaction chamber 26, the mixing and high intensity shearing of the starch paste continued due to the presence of excess steam at temperatures approximating 100 degrees C. The time of retention in the reaction chamber 26 was about 1/10 to 1/2 minute, depending on the amount of excess steam. This reaction preceded an initial thinning action on the originally highly viscous starch paste, which subsequently was discharged through valve 29 into the phase separator 30. Therein the gaseous and vapor phases were separated from the liquid product during an expansion from one level of over atmospheric pressure to another, and the centrifugal action in the cylindrical part of the phase separator 30. The starch paste was then directed via line 32 to the retention vessel 34 which was monitored by the level indication device 40 hereinbefore described.

Hence, the starch slurry can be controllably pasted or modified by maintaining the desired time of reaction and exposure to heat and pressure so as to obtain a paste having the exact characteristics desired for the particular type and grade of product which is being manufactured. It will thus be seen that the unique apparatus herein described for the removal of the gaseous and vapor phase from the fluid material, between the reaction chamber and retention vessel, provides an efficient and novel means for the continuous chemical conversion of starch. Once proper operating conditions have been established, the apparatus will function without attention and produce a steady supply of cooked starch of uniform quality assuming there is no interruption to or change in material supplies. As the starch paste is used, more of the slurry moves into the cooker 20 where it is gelatinized to continue the process.

The herein claimed apparatus provides means for the continuous production of high solid starch paste for coating applications as a replacement for batch cooked and/or chemically and enzymatically converted starch. It further provides a continuous supply of the product as part of the continuous coating color preparation system and offers reduced reaction time as compared with enzyme conversion. Additional advantages are a greater uniformity of the product and a controlled viscosity reduction with stabilization of viscosity. Obviously the apparatus could be made to function automatically by using suitable servo mechanisms for adjusting the valves and other controls in response to changes in raw materials or conditions to assure a uniform product. In particular it is anticipated that pneumatically controlled mechanisms could replace the manually controlled valves schematically represented in the drawing.

It will further be obvious to one skilled in the art that various modifications of the complement elements in the apparatus, and their operation may be possible without departing from the spirit of the invention as defined in the appended claims.

I claim:
1. Apparatus for the continuous conversion of starch comprising:
  (a) a starch slurry tank;
  (b) pump means for conducting the starch slurry to a starch cooker;
  (c) means for the injection of steam into the starch cooker to produce a substantially instantaneous thermal disintegration of the suspended starch particles within said slurry to gelatinize the starch slurry into a paste:
  (d) a converting chamber closed to atmosphere in communication with said starch cooker for receiving the starch paste at an elevated pressure and temperature;
  (e) means connected to said converting chamber to expand and separate the starch paste from its gaseous and vapor phase;
  (f) a retention vessel connected to said expansion and separating means for storing the partially converted starch paste for an additional interval of conversion; and,
  (g) means for removing the fully converted starch product.

2. The apparatus recited in claim 1 further comprising:
  (h) means for selectively controlling the flow of starch paste from said conversion chamber to said expansion and separating means.

3. The apparatus recited in claim 2 further comprising:
   (i) means for selectively controlling the pressure in said expansion and separating means, and said retention vessel.

4. The apparatus recited in claim 3 wherein said expansion and separating means comprises a pressure reducing phase separating device which removes the starch paste from its gaseous and vapor phase by reducing the pressure from one level of over atmospheric pressure to another for controlling the supply rate, retention time and degree of conversion of the product.

5. The apparatus recited in claim 4 wherein said phase separating device comprises a hydrocyclone separator with a larger than normal discharge orifice.

6. The apparatus recited in claim 5 further comprising:
   (j) a level indicating device in said retention vessel for automatically controlling the removal of the starch product.

7. In the method of continuously converting starch which involves the steps of (a) projecting a pressurized slurry of raw starch, (b) impacting said slurry with pressurized steam for substantially instantaneous thermal disintegration of the suspended starch particles within said slurry to gelatinize the starch slurry to a paste, (c) converting said paste at an elevated pressure and temperature, (d) retaining the partially converted starch paste for an additional interval of conversion, and (e) removing the fully converted starch product, the improvement comprising the step of separating the starch paste from its gaseous and vapor phase between the conversion step (c) and retaining step (d) for controlling the supply rate, retention time and degree of conversion.

8. The method of claim 7 wherein the improvement step is accomplished by reducing the pressure from one level of over atmospheric pressure to another.

9. The method of claim 8 wherein the improvement step is carried out in the presence of an excess of steam under a temperature of about 310 degrees F., and a pressure of about 60 p.s.i.g.

10. The method of claim 9 wherein the said starch is converted in the presence of modifying chemicals.

References Cited

UNITED STATES PATENTS

| 3,348,972 | 10/1967 | Taylor | 127—28 |
| 3,404,071 | 10/1968 | Goos | 127—28 X |
| 3,423,239 | 1/1969 | Goos | 127—28 X |
| 3,424,613 | 1/1969 | Huber | 127—28 |

MORRIS O. WOLK, Primary Examiner

SIDNEY MARANTZ, Assistant Examiner

U.S. Cl. X.R.

127—38